(12) United States Patent
Garola et al.

(10) Patent No.: US 11,440,741 B2
(45) Date of Patent: Sep. 13, 2022

(54) AUTOMATED WAREHOUSE WITH SAFE ACCESS SYSTEM

(71) Applicant: EUROFORK S.P.A., Roletto (IT)

(72) Inventors: Alessandro Garola, Cavour (IT); Gianluca Rolfo, Candiolo (IT)

(73) Assignee: EUROFORK S.P.A., Roletto (IT)

( * ) Notice: Subject to any disclaimer, the term of this patent is extended or adjusted under 35 U.S.C. 154(b) by 0 days.

(21) Appl. No.: 17/626,630

(22) PCT Filed: Jul. 17, 2020

(86) PCT No.: PCT/IB2020/056727
§ 371 (c)(1),
(2) Date: Jan. 12, 2022

(87) PCT Pub. No.: WO2021/009718
PCT Pub. Date: Jan. 21, 2021

(65) Prior Publication Data
US 2022/0258985 A1 Aug. 18, 2022

(30) Foreign Application Priority Data
Jul. 17, 2019 (IT) .......................... 102019000012081

(51) Int. Cl.
*B65G 43/00* (2006.01)
*B65G 1/04* (2006.01)
(Continued)

(52) U.S. Cl.
CPC ........... *B65G 43/00* (2013.01); *B65G 1/0414* (2013.01); *G05B 19/058* (2013.01);
(Continued)

(58) Field of Classification Search
CPC ......... G05B 19/058; B65G 43/00; B65G 1/04
See application file for complete search history.

(56) References Cited

U.S. PATENT DOCUMENTS 4,118,792 A * 10/1978 Struger ............... G06F 11/0757
714/E11.002
5,844,795 A * 12/1998 Johnston ............... G06F 11/324
700/83
(Continued)

FOREIGN PATENT DOCUMENTS

DE 102013205397 A1 10/2014
JP 2016113240 A 6/2016
(Continued)

OTHER PUBLICATIONS

International Search Report, issued in PCT/IB2020/056727, dated Oct. 7, 2020, Rijswijk, Netherlands.

*Primary Examiner* — Thomas Randazzo
(74) *Attorney, Agent, or Firm* — Valauskas Corder LLC

(57) ABSTRACT

An automated warehouse has a main path, secondary paths, a main vehicle movable along the main path, one or more auxiliary vehicles movable along the secondary paths, and an access point. On each vehicle a wireless device receiving and sending wireless signals and a control unit associated with safety modules including a safety-certified watchdog timer and a counter are installed. The wireless devices send check signals containing the value of the counter of the respective vehicle to the access point, which sends signals in response to received check signals When a response signal is received from a wireless device, the respective counter is incremented and the associated watchdog timer starts to measure time when the value of the counter differs from the value received via check signals. Each control unit de-energizes the respective vehicle when a time longer than a predetermined time is detected via the watchdog timer.

6 Claims, 3 Drawing Sheets

(51) Int. Cl.
*G05B 19/05* (2006.01)
*G05B 19/418* (2006.01)

(52) U.S. Cl.
CPC .... *G05B 19/41895* (2013.01); *B65G 2207/40* (2013.01); *G05B 2219/24008* (2013.01)

(56) References Cited

U.S. PATENT DOCUMENTS

| | | | | |
|---|---|---|---|---|
| 2002/0007235 | A1* | 1/2002 | Hwang | B60L 3/04 |
| | | | | 701/70 |
| 2008/0055103 | A1* | 3/2008 | Koide | B66F 9/072 |
| | | | | 340/686.6 |
| 2009/0256521 | A1* | 10/2009 | Mori | H02J 7/027 |
| | | | | 320/108 |
| 2010/0258411 | A1* | 10/2010 | Thomas | B65G 43/00 |
| | | | | 198/866 |
| 2018/0053141 | A1* | 2/2018 | Shydo, Jr. | G06Q 10/087 |
| 2020/0002091 | A1* | 1/2020 | Shields | B60L 3/04 |
| 2021/0157293 | A1* | 5/2021 | Sawada | G05B 19/054 |

FOREIGN PATENT DOCUMENTS

| | | |
|---|---|---|
| WO | 2015/011575 A1 | 1/2015 |
| WO | 2017162606 A1 | 9/2017 |

* cited by examiner

AUTOMATED WAREHOUSE WITH SAFE ACCESS SYSTEM

CROSS-REFERENCE TO RELATED APPLICATIONS

This application is a U.S. National Phase filing of PCT International Patent Application No. PCT/162020/056727, having an international filing date of Jul. 17, 2020, which claims priority to Italian Patent Application No. 102019000012081, filed Jul. 17, 2019 each of which is hereby incorporated by reference in its entirety.

TECHNICAL FIELD

The present invention refers to an automated warehouse equipped with a human safety system. The field of application of the present invention is that of automated warehouses with a system for moving cargo units by means of shuttles and satellites, as for example described in patent publication WO 2015/011575 A1.

BACKGROUND ART OF THE INVENTION

An automated warehouse of the aforesaid type comprises at least one main path and a plurality of secondary side paths, perpendicular to the main path, along which storage stations are defined suitable for receiving cargo units. The cargo units are moved by two types of vehicles: a first main self-propelled vehicle (called a "shuttle" or, alternatively, a stacker crane), and a second auxiliary self-propelled vehicle (called a "satellite"), which may be transported by the first. The shuttle moves along the main path, transporting the satellite. Once the shuttle has reached the secondary path at the station where a cargo unit is to be deposited or picked up, the satellite leaves the shuttle and, moving along the secondary path, may deposit or receive a cargo unit.

There is an ever-increasing demand for reducing the cycle time and consequently increasing the number of pallets or cargo units entering and leaving in the unit of time. In order to optimize cycle times, after the satellite leaves the shuttle, the latter may be moved within the warehouse to perform another pick-up or unloading operation at least partially simultaneously with the operation carried out by the satellite.

The control signals for moving the shuttle and the satellite are given by a server through a Wi-Fi access point, which transmits wireless control signals from a fixed position in the warehouse. The access point gives commands and receives signals in return from the vehicles, also with regard to their position in real time. The access point transmits control signals to the shuttle for the movements of both the shuttle and the satellite. The shuttle, acting as a repeater, receives and retransmits the control signals for the satellite to the server through an antenna installed on board the shuttle. The control signals for the satellite are processed by a processing and control unit mounted on the shuttle (or on the stacker crane) resulting in a control signal being generated and propagated to the satellite.

In automated warehouses there is a need to work in conditions of human safety. When it is necessary for an operator to intervene manually within the automated warehouse, the vehicle movement system must ensure that access may occur safely, without risk to the safety of an operator entering the automated area. Since the signals are transmitted wirelessly, and the vehicles are powered by batteries, there is a particular need to have absolute certainty that when an operator accesses the inside of a warehouse, the vehicle operations are all de-energized and therefore the machines may be considered to be in safe mode. The access door to the warehouse does not allow a person to enter unless all the machines are in the emergency state, i.e. de-energized.

To ensure human safety in the current state of the art, the components that are part of the control signal transmission system must have both a component and communication (protocol) safety certification that guarantees that, even in the event of a component not working, the probability that the failure causes or allows an accident to happen is so low that it is negligible. Application in automated warehouses usually requires a minimum certification with performance level "D" (PLd).

To achieve the required safety level, it is known in the art applied to warehouses having a shuttle (or a stacker crane) with satellite to use a "safe" communication using dedicated components that transmit signals wirelessly with the certainty that the data are transmitted securely. It is expensive, and limiting from a technical point of view, to implement a secure wireless data transmission network inside the warehouse that guarantees signal coverage at all points in the warehouse, since a very large number of antennas and access points is required, as well as a customized plan for the individual application.

The lack of full wireless coverage does not meet the safety requirements of the communication protocol used (Profisafe), because when the shuttle and the satellite move away from each other, with current communication systems, communication between shuttle and satellite may be temporarily lost due to the distance between the two vehicles. This prevents the shuttle from performing missions during the masked time, moving away from the satellite and making use of the idle time during which the satellite performs its mission. Furthermore, if it is necessary for an operator to intervene manually inside the automated warehouse, the access point would communicate to the shuttle a de-energization command to be transmitted to the respective satellites. However, if the distance between the shuttle and the satellite is too great, wireless communication between them could be interrupted, thus preventing the transmission of the de-energization command from the shuttle to the satellite, which would continue in its normal operation despite the de-energization request sent by the access point. The operator would therefore not be sure that all vehicles had been de-energized.

SUMMARY OF THE INVENTION

A general object of the invention is to provide an automated warehouse or system which is capable of operating in safety-certified conditions, without incurring the costs and functional disadvantages relating to the installation of the current safety-certified transmission systems. A particular object of the invention is to guarantee human safety in the event of access to the warehouse even without a SAFE communication between the shuttle and one or more moving satellites.

Another specific object of the invention is to acquire the certainty that when a command to put the automated system in emergency mode is given to allow an operator to enter a protected automated area, all wirelessly controlled automated devices are in a certified emergency state.

The aforementioned and other objects and advantages are achieved, according to an aspect of the present invention, by an automated warehouse as described and claimed herein. Preferred embodiments of the present invention are also described.

BRIEF DESCRIPTION OF THE DRAWINGS

The features of a few preferred embodiments of an automated warehouse according to the invention will now be described. Reference is made to the accompanying drawings, wherein.

DETAILED DESCRIPTION

Figure 1:
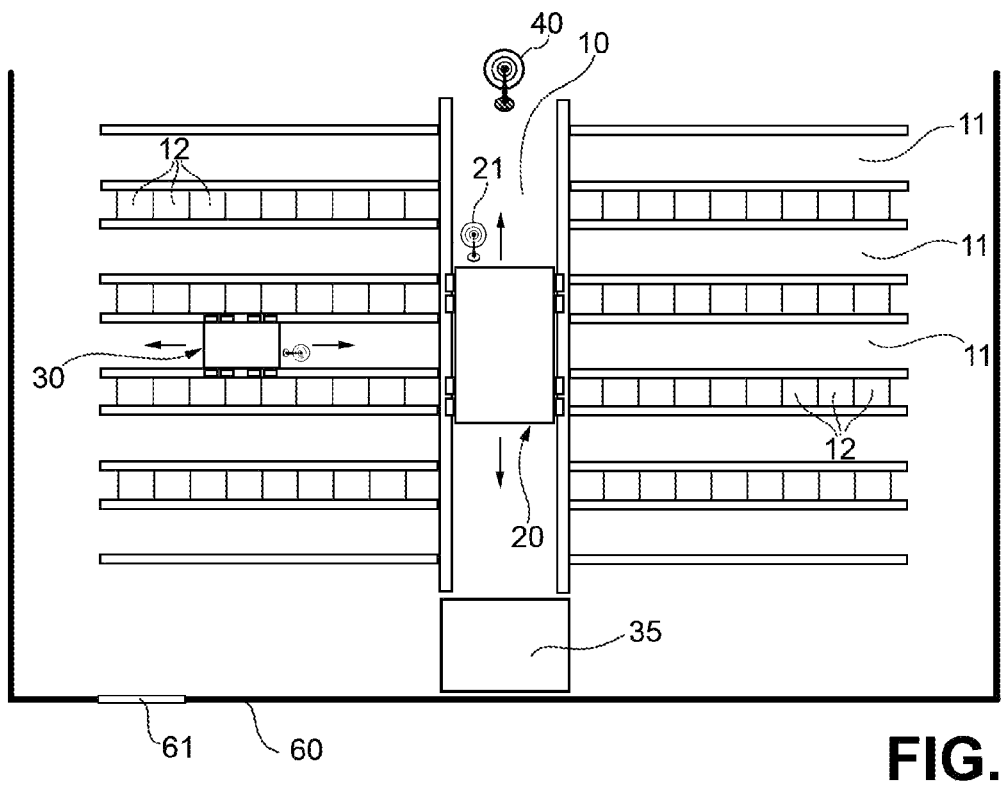
FIG. 1 is a schematic plan view of an automated warehouse according to an embodiment of the invention.

Referring initially to FIG. 1, an automated warehouse comprises at least one aisle or main path 10 and a plurality of secondary paths 11, perpendicular or transverse to the main path 10. Typically, the main path is a straight path that extends centrally in the warehouse, and the secondary paths are straight side paths that branch perpendicular to the main path on both sides thereof.

Along the secondary paths 11 storage stations 12 are defined which are suitable for receiving cargo units (not shown). The cargo units are moved by a first main self-propelled vehicle 20 (called a "shuttle"), and a second auxiliary self-propelled vehicle 30 (called a "satellite"), which may be transported by the first vehicle. An example of an automated warehouse, to which the present invention is applicable, is known from WO 2015/011575 A1.

The shuttle 20 may manage the operations of one, two or more satellites 30, to perform a plurality of missions at least partially simultaneously.

Optionally, the warehouse may extend on several superimposed horizontal levels according to a multi-storey structure; in this arrangement, a lifter or elevator 35 (FIG. 1) may be provided to bring the shuttle 20 up and down from one level to another of the warehouse. Alternatively, a shuttle may be installed with one or more related satellites at each level of the warehouse.

Figure 2:
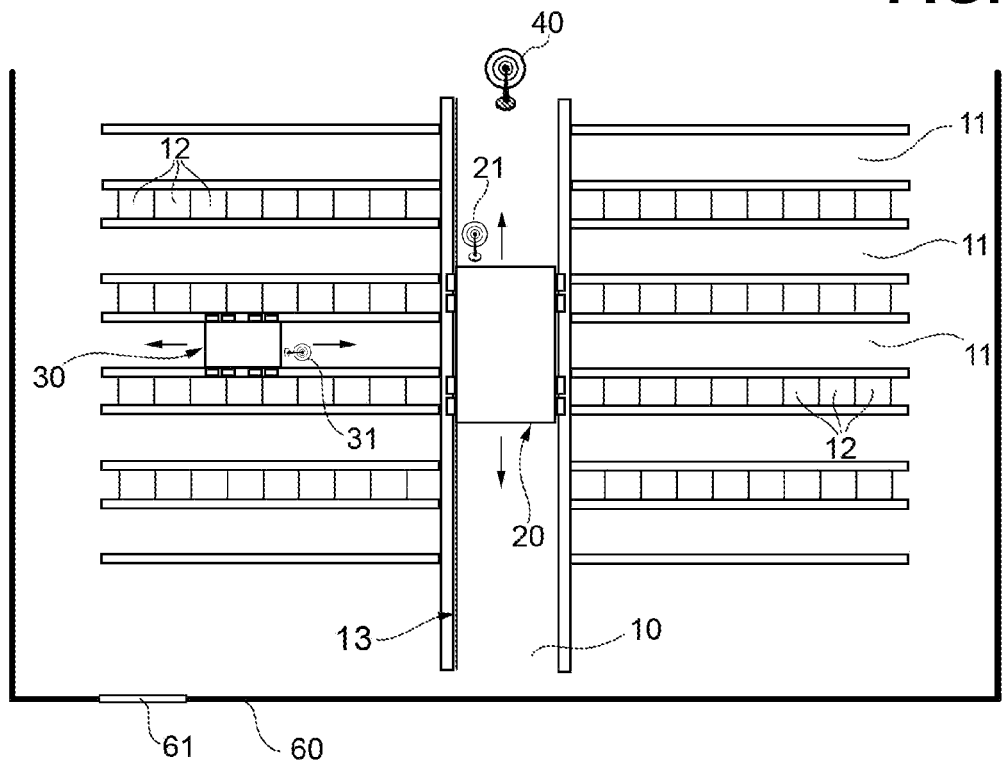
FIG. 2 is a schematic plan view of an automated warehouse according to a different embodiment of the invention.

The shuttle and satellites 20, 30 are vehicles with electrical traction. In the embodiment illustrated in FIG. 1, both the shuttle 20 and the satellite 30 are energized by batteries and/or supercaps (supercapacitors) mounted on board. In the embodiment illustrated in FIG. 2, the satellite 30 is energized by a battery, while the shuttle 20 may be energized by a bus bar 13, which extends along the main path 10 to distribute electric current to the shuttle 20 or to the stacker crane having the battery/supercap-powered satellite on board.

An access point 40 is installed on a fixed part of the warehouse, for example on a wall, conveniently in a central position opposite the main path or aisle 10. The access point 40 is not a device characterized by a safety-certified communication. "Access point" means an electronic telecommunications device which, connected to a wired network, or even, for example, to a router, allows another mobile device to access it directly in wireless mode.

As an example, a 5-GHz wireless device with a secure connection with WPA2-PSK(AES) encryption may be chosen as the access point 40.

In this context, the expression "safe" or "safety" means devices compliant with EN 13849-1:2008, with regard to electromechanical, mechanical or hydraulic control system parts related to safety according to the performance level PL; and to IEC EN 62061-1:2005, with regard to the reliability and safety of programmable electronic/electric command and control systems, according to the SIL (Safety Integrity Level). There is a correspondence between PL and SIL which is tabulated.

The access point 40 is connected, preferably with Ethernet technology, to a server 41 (FIG. 3) which oversees the operation of the automated warehouse as a whole, therefore also the operation of the vehicles here described.

A wireless device 21 is installed on the shuttle 20, and a wireless device 31 is installed on the satellite 30. The wireless devices 21, 31 may be properly configured to receive and/or send signals using Wi-Fi, Bluetooth or other technologies. The access point 40 sends the information received from the server 41 to the shuttle 20.

The shuttle and the satellite 20 and 30 both have a respective control unit 22, 32 on board with associated safety modules dedicated to the management of the safety aspects of the application.

Preferably, the control units may be PLCs (Programmable Logic Controllers). Alternatively, the control units may be, for example, microprocessors or microcontrollers.

The access point 40, connected to the server 41, sends and receives wireless communication signals to the shuttle's wireless device 21. The communications between the access point and the shuttle may take place either according to the safe standard or not. Communications that do not comply with the safe standard are made through a non-certified safe communication protocol (for example, not in compliance with the Profisafe protocol).

The wireless device 31 on the satellite 30 may indirectly receive the communication signals coming from the access point through a transmission of these signals by the wireless device 21 of the shuttle 20 and sends communication signals to the access point through a transmission of these signals by the wireless device 21 of the shuttle 20. These communications, between the shuttle and the satellite, do not take place according to a safe standard. In alternative embodiments, the wireless device 31 on the satellite 30 may also communicate (receive and transmit) the communication signals directly to and from the access point, independently of the shuttle's wireless device 21.

Therefore, in order to make up for the non-compliance with the safety standards of the communications between shuttle and satellite (and possibly also communications between access point and shuttle), so that the system may satisfy the safe standard required by the application, each control unit 22, 32 is associated with safety modules provided on board the shuttle 20 and on board the satellite 30 and provided with a safety-certified watchdog timer 23, 33 (e.g. available on the Siemens safety platform).

Each control unit 22, 32 uses the respective watchdog timer 23, 33 in order to detect any communication interruptions between the various wireless devices, so as to activate a safety function in case of failure to communicate for a predetermined time.

Each watchdog timer 23, 33 is associated with a respective counter (supervisor timing), incorporated in the respective safety module.

The access point 40 is set to send signals to the wireless device 21 of the shuttle and to the wireless device 31 of the satellite in response to the check signals received, according to a closed signal loop.

In particular, during normal operation, the wireless device 21 of the shuttle 20 sends check signals regularly at predetermined time intervals to the access point 40 and thus to the server 41. The wireless device 31 of the satellite 30 also regularly sends check signals to the access point 40, via the wireless device 21 of the shuttle 20.

Each time the response signal is received, the respective counter of the vehicle that has received this response signal is incremented (or decremented, depending on the setting). If the value received is different from the one sent, the watchdog timer of the vehicle that has encountered this difference will start measuring the elapsed time.

The time measured by the watchdog timer is reset each time the respective counter is changed. If the time measurement exceeds a predetermined time of non-communication, the control unit on board the vehicle in question automatically de-energizes the vehicle.

Figure 3:
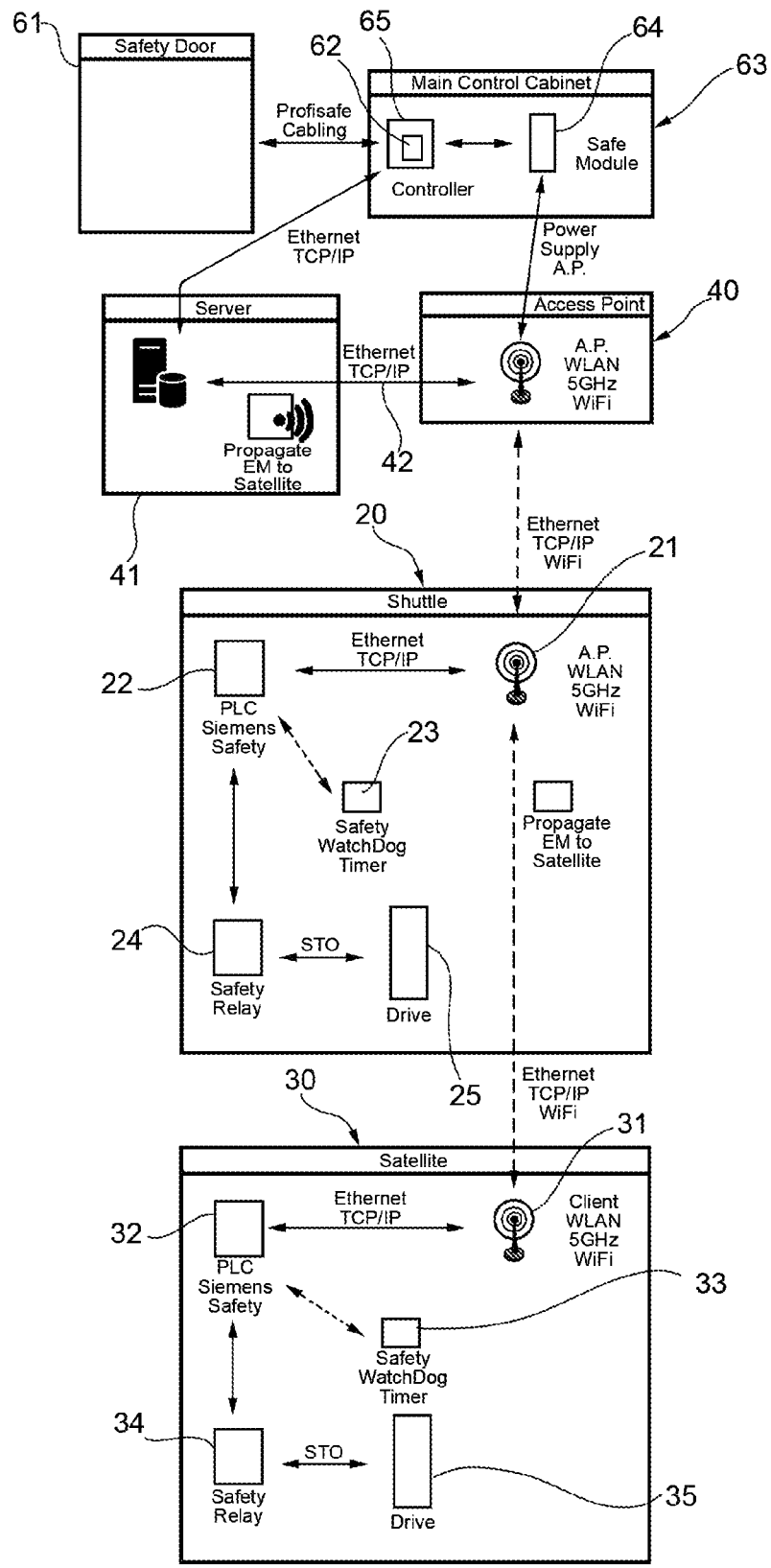
FIG. 3 shows diagrammatically the wireless devices of the automated warehouse.

With reference to FIG. 3, a respective safety contactor or relay 24, 34 is provided on board the shuttle 20, and satellite 30, operatively connected to the control unit 22, 32 and to a drive unit 25, 35 which controls the electric propulsion system (not shown) of the shuttle 20 or the satellite 30, respectively. The safety relay 24, 34 is provided to receive a de-energization command from the on-board control unit 22, 32 and to open in order to interrupt the supply of electrical power from the battery and/or supercaps (or from the bus bar if the shuttle is not powered by battery) to the drive unit 25, 35 and thus to the propulsion system, therefore putting the vehicle into safe mode.

Preferably, the predetermined time is chosen to be long enough to cover an interval of time that allows a satellite to perform a mission estimated to be the mission with the maximum duration. This prevents the satellite from being put into safe mode if the distance between the satellite and the shuttle entails a temporary loss of communication which would not actually require being put into safe mode, being in any case compatible with the risk analysis of the system. The predetermined time may therefore be calculated according to the length of the maximum path that may be traveled by the satellite within the warehouse.

Figure 4:
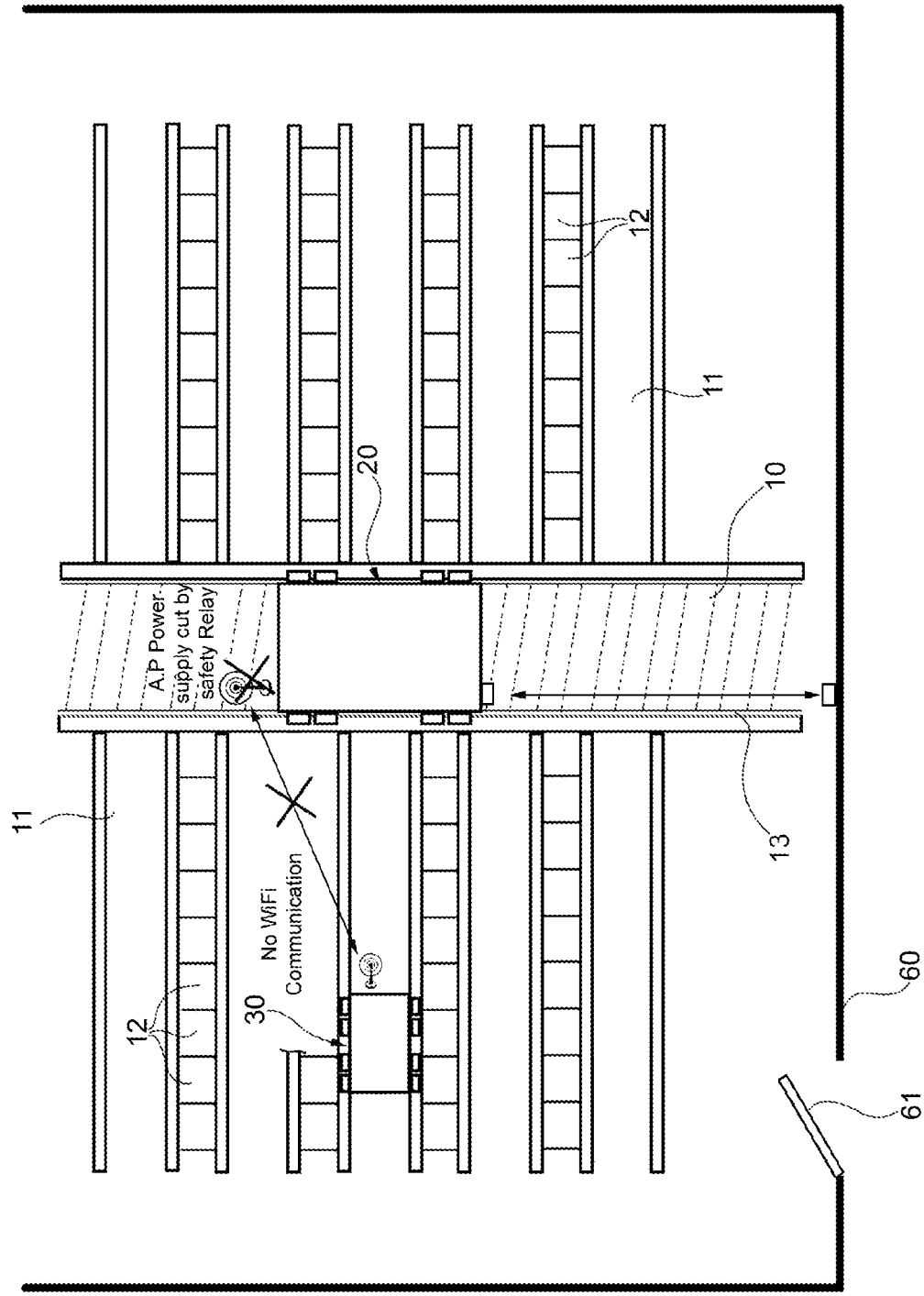
FIG. 4 schematically illustrates the automated warehouse in an operating condition where a warehouse access door is open and the vehicles inside the warehouse are put in safe mode.

The area of the warehouse where the automated equipment operates is surrounded by a fence 60 (FIG. 4), access to which is possible only from one or more safety doors 61 through a request for access or by properly designed accesses.

A procedure for safe access to an automated warehouse equipped with the safety system described above is described hereinafter. To access the automated warehouse, the operator/maintenance technician must first press an entry button 62 (entry request button) located on a controller 65 located on an electrical panel or "main control cabinet" 63, near the safety door 61. The main control cabinet 63 is used to manage the warehouse access signals through the safety door 61. The main control cabinet is equipped with a safety module 64 which is used to cut the power supply of the wireless access point device 40.

Upon activation of the entry button 62, the server 41 attempts to send an emergency signal to the wireless devices 21, 31 of all the automated shuttles and satellites within the warehouse. As previously mentioned, the server 41 communicates with the shuttle 20 and with the satellite 30 via the access point 40 and optionally with the controller 65 of the electrical panel 63 of the system. When an access request is made from the safety door, the controller 65 communicates it to the server 41, which in turn commands a "Propagate EM to Shuttle" propagated emergency signal through a NON safe communication channel, for example an Ethernet channel 42. At this point, the controller 65 of the ground panel "Main Control Cabinet" 63 cuts the power supply to the access point 40.

During normal operation, through the wireless device 21 (which may be a WLAN repeater), the shuttle 20 receives the commands from the access point 40 and sends a response to the server 41 and possibly transmits the commands received from the server 41 to the wireless device 31 of the satellite 30.

When the shuttle's wireless device 21 receives a "Propagate EM to shuttle" signal from the server, the same wireless device 21 in turn sends the NON safe "Propagate EM to Satellite" propagated emergency signal to the wireless device 31 of the satellite and, via the safety relays, the STO (safety torque off) signals to the drive unit 25 are opened to switch off the shuttle propulsion system.

When the power of the access point is cut, the server no longer communicates with the wireless device 21 of the shuttle 20 and therefore the watchdog timer 23 is triggered, which reaches a certain threshold so that the safety relay 24 opens the STO (safety torque off) signals of drive unit 25. When the STO signals are open, all the impulses to the drive units that manage the power going to the shuttle's propulsion system are blocked.

Likewise, the satellite 30 normally receives the server commands through the wireless device 31 via the shuttle's wireless device 21. When the "Propagate EM to Satellite" signal is received through a NON safe channel, the satellite control unit 32 opens the STO (safety torque off) signals of the drive unit 35 of the satellite via the safety relay 34. When the power to the access point is cut, the server no longer communicates with the control unit 32 of the satellite and the watchdog timer 33 is triggered, which, once a certain threshold is reached, causes the safety relay 34 to open the STO signals of the drive unit 35. When the STO signals are open, all the impulses to the drive unit that manage the power going to the satellite's propulsion system are blocked.

The server then waits for confirmation from all the wireless devices 21 and 31; however, without the certainty of transmitting the signal through a safe protocol, it is not guaranteed that the system has been put in safe mode. In effect, one or more vehicles within the automated perimeter may not be in communication and therefore may not have received the request to go into safe mode.

At the same time, however, a ground safety system cuts the power to the ground access point 40 with the correct performance level, thus certifying that in any case the machines are no longer receiving response signals from the server, interrupting the increment in the counter and thus activating the watchdog timer present in the safety modules associated with the respective control units of the shuttle 20 and 32 of the satellite 30.

At the same time, upon receiving the emergency signal, the server also instantly deactivates the equipment powered by cable or bus bar: one or more safety contactors are automatically activated, opening corresponding circuits to interrupt the power supply to the devices powered by cable or via bus bar, pending the elimination of the fault or error condition. When all shuttles and satellites have acquired direct or indirect emergency status, the safety door opens.

The safety door 61 automatically unlocks, in safe mode, at the end of the period of time set by the watchdog timer, with the shuttles and vehicle satellites all in the emergency state. The condition for putting in safe mode is reached also if there is a failure in the communication between the wirelessly controlled shuttles and satellites and the access point.

Turning off the access point causes wireless devices 21 and 31 on the shuttle and on the satellite to no longer receive the response signal from the access point in response to the check signals. In this case, after a pre-established period of time from sending the check signal without the wireless device 21 or 31 on the related vehicle 20 or 30 receiving the response signal from the access point 40, the respective control units generate a de-energization command which automatically puts the respective vehicle in the emergency state.

Therefore, an emergency situation is recognized by detecting the absence of a signal, namely the response signal from the access point. Stopping vehicles controlled wirelessly is carried out in safe mode, with an adequately sized implementation with a minimum performance level d (PL d), even in the absence of an expensive safety-certified access point device. The safe mode is achieved given that, in the absence of a return signal from the access point, the counter and the watchdog timer (safety-certified) on board each vehicle react promptly and disconnect the power supply of the motors via the safety contactors provided and inserted in a safety-certified circuit on board the vehicles.

In conclusion, by safely disconnecting the power of the ground access point and using the wireless system with the adoption of safety timers, the vehicles described above may satisfy the safety requirements required by current legislation without requiring the use of wireless safety as per the current state of the art; it is only necessary to wait the time programmed in the safety timers established initially by design.

Various aspects and embodiments of the invention have been described; it is understood that each embodiment may be combined with any other embodiment. Furthermore, the embodiments and the details of construction may vary widely with respect to what has been described and illustrated purely by way of non-limiting examples, without thereby departing from the scope of the invention, as defined in the appended claims.

The invention claimed is:

1. An automated warehouse, comprising:
   at least one main path, a plurality of secondary paths transversal to the at least one main path with a plurality of storage stations arranged along the secondary paths;
   at least one main vehicle with electric traction, movable along the at least one main path;
   at least one auxiliary vehicle with electric traction powered by a battery and/or supercapacitor, movable along the secondary paths and transportable by the at least one main vehicle;
   at least one access point at a fixed position in the automated warehouse;
   each main vehicle and auxiliary vehicle having installed:
   a wireless device configured to receive and send wireless signals; and
   a respective control unit with associated with safety modules including a respective safety-certified watchdog timer and a respective counter;
   wherein the wireless device on each vehicle is configured to send, directly or indirectly to the at least one access point, at predetermined time intervals, a check signal containing a value of the counter of the vehicle transmitting said check signal;
   the at least one access point is set to send to the wireless devices signals in response to received check signals;
   each time a response signal is received by a wireless device, the respective counter is incremented or decremented and the respective safety-certified watchdog timer starts measuring time from when the value of the respective counter differs from the value received via the check signal;
   each control unit being set to de-energize a respective vehicle upon detection, via the respective safety-certified watchdog timer, that a time longer than a predetermined time has elapsed.

2. The automated warehouse of claim 1, wherein the at least one access point is not a device having safety-certified communication.

3. The automated warehouse of claim 1, wherein the wireless devices are not devices having safety-certified communication.

4. The automated warehouse of claim 1, wherein the control units are Programmable Logic Controllers (PLCs).

5. The automated warehouse claim 1, wherein each safety-certified watchdog timer is incorporated in a respective safety module.

6. The automated warehouse of claim 1, wherein said predetermined time is long enough to cover a time interval which allows the at least one auxiliary vehicle to carry out a mission estimated to have maximum duration for the automated warehouse.

* * * * *

UNITED STATES PATENT AND TRADEMARK OFFICE
CERTIFICATE OF CORRECTION

PATENT NO. : 11,440,741 B2
APPLICATION NO. : 17/626630
DATED : September 13, 2022
INVENTOR(S) : Alessandro Garola and Gianluca Rolfo It is certified that error appears in the above-identified patent and that said Letters Patent is hereby corrected as shown below:

In the Claims

Column 8, Line 12 delete the first occurrence of the term "with"

Signed and Sealed this
Third Day of January, 2023

Katherine Kelly Vidal
*Director of the United States Patent and Trademark Office*